United States Patent [19]

Schofield

[11] 4,304,202
[45] Dec. 8, 1981

[54] AUTOMOBILE SPEED CONTROL DEVICE

[76] Inventor: Robert R. Schofield, 936 E. 34th St., Erie, Pa. 16504

[21] Appl. No.: 108,361

[22] Filed: Dec. 31, 1979

[51] Int. Cl.³ .............................................. F02D 11/08
[52] U.S. Cl. .................................... 123/363; 123/376; 123/350; 180/171; 180/172
[58] Field of Search ................................ 180/170–171, 180/172, 173, 174, 175, 176, 177, 178, 179; 123/363, 376, 350

[56] References Cited

U.S. PATENT DOCUMENTS

| | | | |
|---|---|---|---|
| 1,604,936 | 10/1926 | Tabb et al. | 123/376 |
| 2,594,739 | 4/1952 | Davis | 180/171 |
| 2,978,059 | 4/1961 | Miller | 180/172 |
| 3,099,330 | 7/1963 | Von Berg | 180/177 |
| 3,538,898 | 11/1970 | Edgemir | 123/179 BG |
| 3,575,257 | 4/1971 | Wojcikowski | 123/376 |

Primary Examiner—Ronald B. Cox

[57] ABSTRACT

A speed control for an engine having a throttle and a drive shaft made up of a selective gear connected to a differential gear and a responsive gear connected to a second differential gear all rotatable about a common axis. Two differential pinions rotatably connected to the differential gears and supported on a pinion shaft disposed at right angles to the axis. The center of the pinion shaft being attached to a drum mounted concentric to the axis and having an actuating member connected from the drum to the engine throttle and a reference motor operatively connected to the first side gear to drive it at a selected speed and a drive shaft from the engine driving the second side gear.

6 Claims, 2 Drawing Figures

AUTOMOBILE SPEED CONTROL DEVICE

REFERENCE TO PRIOR ART

The following U.S. Pat. Nos. show various types of speed controls for automobile engines, but none of them show the arrangement of components that result in an efficient, accurate speed control possible with the control disclosed herein:

2,276,794;
2,372,702;
3,099,330;
3,216,522;
3,270,728;
3,392,799;
3,575,257;
4,058,094;
4,132,284.

OBJECTS OF THE INVENTION

It is an object of the invention to provide and improved speed control.

Another object of the invention is to provide a speed control that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the invention.

GENERAL DESCRIPTION OF THE DRAWINGS

DETAILED DESCRIPTION OF THE DRAWINGS

Figure 1:
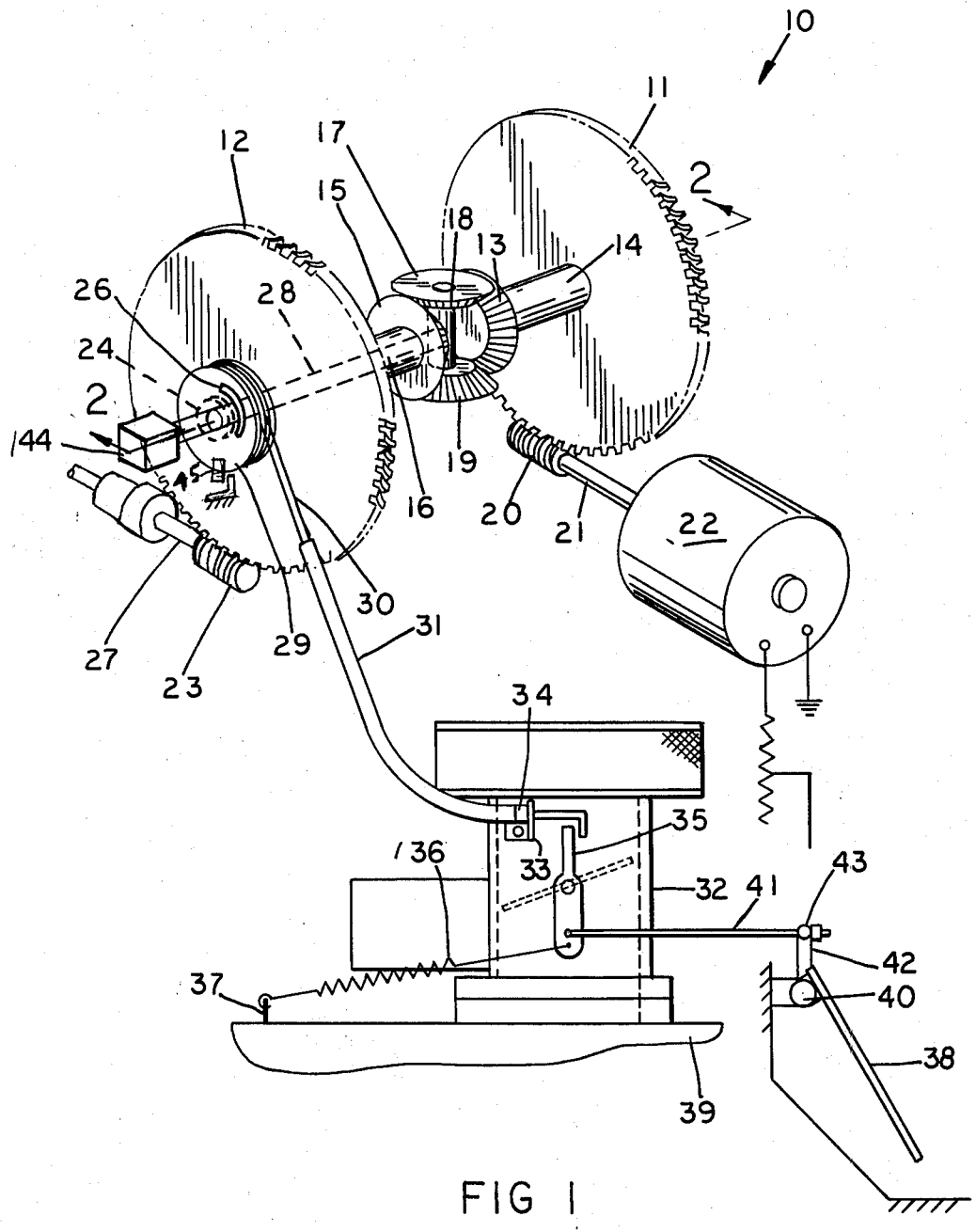
FIG. 1 shows a diagrammatic view of the speed control according to the invention.

Now, with more particular reference to the drawings. I show an automobile speed conrol device 10 for maintaining a predetermined cruising speed made up of the selective speed gear 11 and the responsive speed gear 12. The selective speed gear 11 is fixed to the first differential side gear 13 by the shaft 14 and the second differential side gear 15 is fixed to the responsive speed gear 12 by the shaft 16. The first differential pinion 17 is freely rotatably supported on the stud shaft 18 and the second differential pinion 19 is freely rotatably supported on the opposite end of the stud shaft 18 from the pinion 17. The gears 11, 12, 13 and 15 all have teeth on them and the teeth on the selective speed gear 11 rotatably engage the worm wheel 20 on worm selective speed shaft 21 which is driven by the control speed motor 22. Motor 22 may be electronically driven or driven by vacuum or by hydraulics. The responsive speed gear 12 is in the form of a worm gear that is driven by the worm wheel 23 in turn fixed to the worm shaft 27 which may be driven by the speedometer shaft of an automobile.

The stud shaft 18 has its central part fixed to the drum shaft 28 which has the drum 29 connected to it by clutch 26 and 24 and the correction cable 30 is wrapped and unwrapped on the drum 29 depending on the direction of rotation of the drum 29 connected to it by clutch 26 and 24 and the correction cable 30 is wrapped and unwrapped on the drum 29 depending on the direction of rotation of the drum shaft 28. The cable 30 is slidably supported in the cable sheath 31 which is supported on the carburetor 32 through a bracket 33 on its end that makes contact with the throttle lever 35. The throttle lever 35 is urged against the bracket 33 by a spring 36 which is anchored at 37 to the carburetor. An accelerator pedal 38 is pivoted to the engine frame 39 and 40 and connected to the throttle rod 41 by a bracket 42 which is attached to the throttle rod 41 by means of a pivot 43. The solenoid 44 disconnects clutch 26 and 24 which connects the drum shaft 28 and 128 to drum 29 and 129 to actuate the cable 30.

Figure 2:
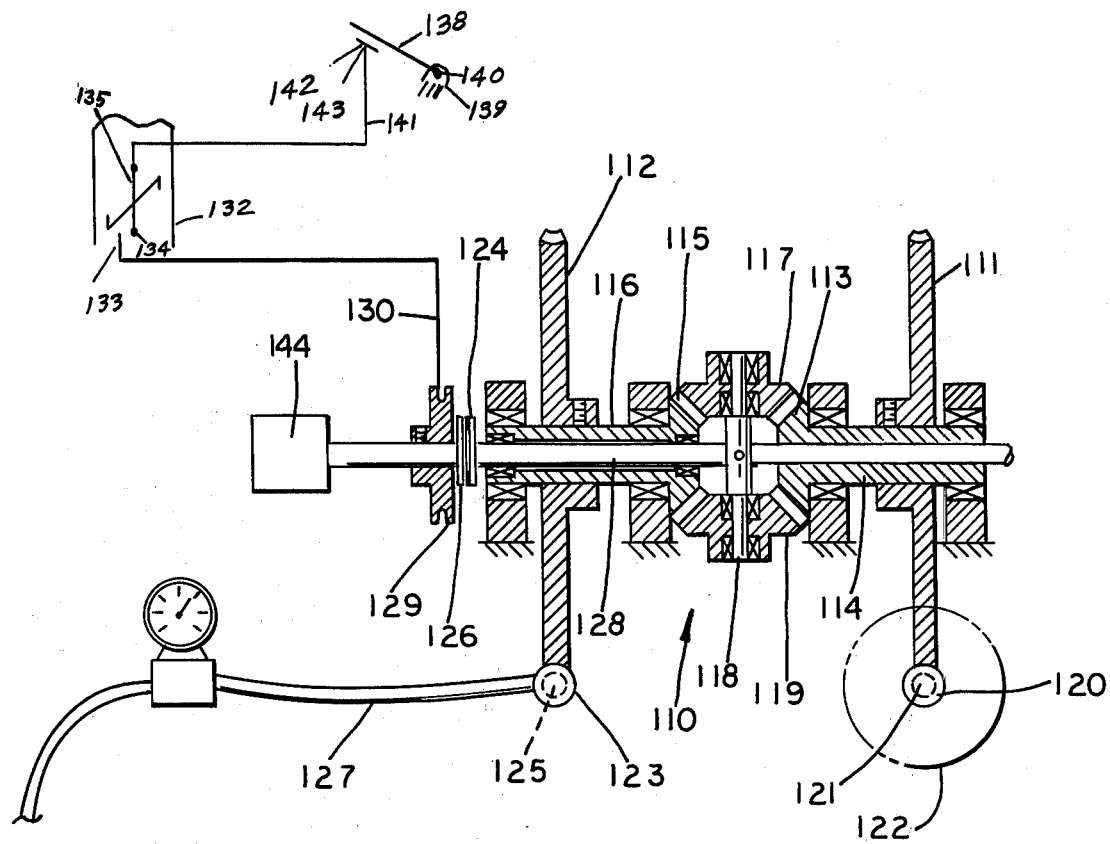
FIG. 2 shows a longitudinal cross-sectional view of the gearing arrangement for the speed control.

In the embodiment shown in FIG. 2 I show a stabilized control 110 for cruising speed made up of the selective speed gear 111 and the responsive speed gear 112. The selective speed gear 111 is fixed to the first differential side gear 113 by the shaft 114 and the second differential side gear 115 is fixed to the responsive speed gear 112 by the shaft 116. The first differential pinion 117 is freely rotatably supported on the stud shaft 118 and the second differential pinion 119 is freely rotatably supported on the opposite end of the stud shaft 118 from the pinion 117. The gears 111, 112, 113 and 115 all have teeth on them and the teeth on the selective speed gear 111 rotatably engage the worm wheel 120 on worm selective speed shaft 121 which is driven by the control speed motor 122. The responsive speed gear 112 is in the form of a worm gear that is driven by the worm wheel 123 connected to the worm shaft 125 which in turn is fixed to the cable 127 which may be driven by the speedometer shaft of an automobile.

The stud shaft 18 has its central part fixed to the drum shaft 128 which has the drum 129 connected to it by clutch 26 and 24 and the correction cable 130 is wrapped and unwrapped on the drum 129 depending on the direction of rotation of the stud shaft 118 and 18, drum shaft 28 and 128 and clutch 26 and 24. The cable 130 is slidably supported in the cable sheath 131 which is supported on the carburetor 132 through a bracket 133 and the cable lug 134 on its end that makes contact with the throttle lever 135. The throttle lever 135 is urged against the lug 134 by a spring 136 which is anchored at 137 to the carburetor. An accelerator pedal 138 is pivoted to the engine frame 139 and 140 and connected to the throttle rod 141 by a bracket 142 which is attached to the throttle rod 141 by means of a pivot 143.

CONDITIONS OF OPERATIONS

1. Stabilized control for cruising speed on level ground: Operator of vehicle selects a desired speed by varying the speed of the selective control speed motor while observing the speedometer as a guide to set this speed only once. This setting need not be changed during the course of driving unless a different cruising speed should be desired. The resulting speed will then be maintained automatically and precisely by the speed control system, while having the capacity to maintain this speed with exacting accuracy when encountering changing grade levels. The selective speed motor turns selective speed worm and shaft which turns selective speed gear at reduced ratio, the reduced ratio being needed to prevent rapid action of the throttle to its extreme positions before the vehicle speed could respond. The differential side gear 113 which is fastened to the selective speed gear 111 bears force upon two differential pinion gears 117, 119, the vehicle wheels have been accelerated to the desired vehicle speed, and the output section of the transmission is rotating the cable 127 to the speedometer and to the responsive speed worm wheel 123 and the worm shaft 125. This rotation is in the opposite direction of the selective speed worm wheel 123 and worm shaft 125, turning the responsive speed gear 112 in the opposite direction of the selective speed gear 111. The differential side gear 115 which is fastened to the responsive gear 112 will exert force upon the two differential pinion gears 117, 119 since the differential side gears are turning in opposite directions at the same speeds, and all opposing gears in the system are of equal pitch and dimension, the differential pinion gears will rotate on their axis which is the stud shaft 118 without causing the stud shaft 118 to swing around the shaft 128. The stud shaft 118 is rigidly fastened to the servo output drum shaft 128, which extends through the hollow axis of the differential side gears 115, 113. One end of the servo output shaft drum 128 can be applied to any of several types of devices to actuate and to hold the throttle in position. The device shown here, a winch drum 129 and cable 130, is used for the purpose of describing the operation of the system and is not intended to be represented as an integral part of the patent of the differential servo. The drum is driven by the servo output drum shaft 128 through a mechanical coupling 126 and 124 which is kept engaged by a solenoid 144. A sliding cable within a housing is connected to the throttle linkage at one end and at the opposite end is connected to a flexible cable which winds around the winch drum. While the vehicle is cruising in unvarying condition as described, no change of action will happen within the system from the servo output drum shaft 128 to the throttle. Hence, steady speed is maintained.

Automatic correction of vehicle speed as the vehicle encounters a rising grade is as follows:

The vehicle speed begins to diminish when the vehicle enters a rising grade, which decreases the speed of the responsive worm wheel 123 and shaft 125 and the responsive gear 112 and one of the two side gears 115 which is attached to the responsive gear 112. The resulting loss of speed of engagement of teeth in the responsive side of the differential gears causes the selective speed gear 111 to advance the differential pinion gears 117, 119 and their common axis, stud shaft 118 and the servo output drum shaft 128 to move in a direction to open the throttle. The resulting motion of the winch drum (or other actuating device) causes the vehicle engine throttle to begin to further open and again cause the vehicle speed to increase. As all responsive gears again approach the speed of the selective gears, the stud shaft 118 and servo output drum shaft 128 are not advanced further and remain stationary while holding the engine throttle in its corrected position.

Automatic correction of vehicle speed as the vehicle reaches level ground from an upgrade is as follows:

As the vehicle proceeds to level ground, or onto a lesser upgrade, the vehicle speed will begin to increase, causing the responsive gears to exceed the opposite and matching speed of the selective gears. The resulting differential action will cause the pinion gears 113 and 115 to move the stud shaft 118 and servo output drum shaft 128 in the opposite direction and decrease the throttle opening to its corrected position for desired vehicle speed.

Automatic correction of vehicle speed as the vehicle begins to descend a grade is as follows:

The vehicle speed will begin to increase as the vehicle enters a downgrade of limited degree. As the resulting increase of speed of the responsive gears 111 and 112 cause the differential servo gears to move in the counter direction, as previously described, the throttle opening will then be reduced, allowing the vehicle to cruise at the matching selective speed.

Reaction of the system when the vehicle encounters an exceedingly steep downgrade is as follows:

When the vehicle enters a steeper grade of such degree that the force of gravity causes the vehicle to exceed a speed equal to that of the selected speed set on the motor 122, the resulting differential action of the servo closes the throttle to its extreme position and will not have any further effect on limiting the speed of the vehicle. Any further control in this situation, if desired, would be left to the option of the operator as the purpose of this invention is to control the speed of the vehicle by automatically regulating the application of power and not by including any application of the braking system of the vehicle.

Reaction of the system when the operator surpasses the selected speed of the vehicle by use of the foot accelerator is as follows:

When the operator wishes to exceed the selected vehicle speed, such as when overtaking another vehicle, the operator depresses the foot accelerator which further opens the throttle and causes the vehicle speed to increase. The increased speed of the responsive gears would move the servo output shaft in the counterclockwise direction, as previously described, but would not have any efect on the throttle which the operator would be holding open. If the operator should sustain this condition for a period of time which would exceed that required for the servo to move the output shaft to its extreme closed direction, the driction drive on the output shaft would encounter a stop tab 45 then would slip to prevent damage to the parts, or as in the case of a winch drum, prevent the drum for rewinding the cable from reopening the throttle and causing runaway engine speed. As the operator releases the foot accelerator to allow the system to assume control there would be no reaction upon the direction of the servo output shaft until the responsive gears slightly decreased their speed below the speed of the selective gears, reversing the rotation of the pinion gears and in turn reversing the direction of the servo output shaft in the direction described as open until the relative and opposite speeds of the responsive speed gears and the selective speed gears again matched, stopping the servo output shaft at the correct throttle position.

Reaction of the system when disengagement is required is as follows:

The system must be required to instantly release the throttle when the brake is applied. This could be achieved by a brake pedal switch which would open the circuit to the drum engagement solenoid (or other device). Also, the system could employ a master switch (not shown) for use at the operator's option. Also, for reason of safety, a switch, (not shown) should be used to prevent the system from being engaged at a vehicle speed of less than thirty miles per hour. This would prevent the operator from inadvertantly engaging the cruise control system when stopped, starting, or driving slowly in congested traffic.

Summary of facts concerning the system:

(a) Control and servo are a complete entity.
(b) Control speed need only be set once.
(c) Operator may vary speed of vehicle without disengaging system.
(d) Operator may resume vehicle cruising speed without observing speedometer.
(e) Differential gears are either holding servo in correct stationary position, or are causing corrective motion. There is no lost motion or backlash.
(f) Slight correction and greater correction follow an inverse scale of differential output response.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A speed control for a motor having a throttle and having a drive shaft comprising,
   a selective speed gear,
   a reponsive speed gear,
   and a first differential side gear fixed to said selective speed gear and a second differential side gear having teeth and fixed to said responsive gear,
   said gears being rotatable about a common axis,
   a first differential pinion and a second differential pinion axially spaced from each other and making mating contact with said differential side gears,
   a stud shaft,
   said differential pinions being freely rotatable on said stud shaft,
   a reference motor connected to said selective speed gear and means operatively connecting said responsive speed gear to said drive shaft,
   control means to select the speed of said reference motor,
   means connected directly to said stud shaft to rotate said throttle whereby said throttle is open when said drive shaft rotates faster than the reference motor and said throttle is closed when said drive shaft rotates slower than said reference motor and said throttle is held at a constant setting when said reference motor and said drive shaft rotate at the same speed,
   said means connecting said stud shaft to said throttle comprises,
   a differential output shaft connected to the center of said stud shaft and rotating about an axis perpendicular to the axis of said stud shaft,
   said means connecting said stud shaft to said throttle valve comprising,
   a drum connected to said stud shaft and said cable wrapped on said drum and connected to said throttle,
   said drum being adapted to be rotated by said stud shaft to wrap said cable on said drum opening said throttle when said responsive gear rotates in a first direction and to unwrap said cable from said drum when said responsive gear rotates in a second direction,
   an anchor lug is fixed to said control and said drum has a stop thereon adapted to engage said anchor lug to limit the rotation of said drum.

2. A speed control for a motor having a throttle and having a drive shaft comprising,
   a selective speed gear,
   a responsive speed gear,
   and a first differential side gear fixed to said selective speed gear and a second differential side gear having teeth and fixed to said responsive gear,
   said gear being rotatable about a common axis,
   a first differential pinion and a second differential pinion axially spaced from each other and making mating contact with said differential side gears,
   a stud shaft,
   said differential pinions being freely rotatable on said stud shaft,
   a reference motor connected to said selective speed gear and means operatively connecting said responsive speed gear to said drive shaft,
   control means to select the speed of said reference motor,
   means connected directly to said stud shaft reference motor, said throttle whereby said throttle is open when said drive shaft rotates faster than the reference motor and said throttle is closed when said drive shaft rotates slower than said reference motor and said throttle is held at a constant setting when said reference motor and said drive shaft rotate at the same speed,
   said means connecting said stud shaft to said throttle valve comprising,
   a drum connected to said stud shaft and said cable wraped on said drum and connected to said throttle,
   said drum being adapted to be rotated by said stud shaft to wrap said cable on said drum opening said throttle when said responsive gear rotates in a first direction and to unwrap said cable from said drum when said responsive gear rotates in a second direction,
   an anchor lug is fixed to said control and said drum has a stop thereon adapted to engage said anchor lug to limit the rotation of said drum.

3. The combination recited in claim 2 wherein said means connecting said cable to said stud shaft comprises an electrically operated clutch.

4. The combination recited in claim 1 wherein said means connecting said cable to said stud shaft comprises an electrically operated clutch.

5. The combination recited in claim 4 wherein said means for connecting said responsive speed gear to said drive shaft comprises a speedometer cable connected to the drive shaft of said automobile.

6. The combination recited in claim 5 wherein said speedometer cable has a speedometer thereon and said responsive speed gear is driven by a shaft having a gear in mating engagement with said responsive speed gear.

* * * * *